(12) United States Patent
Kim et al.

(10) Patent No.: US 9,361,014 B2
(45) Date of Patent: Jun. 7, 2016

(54) GRAPHICAL USER INTERFACE, DISPLAY APPARATUS AND CONTROL METHOD THEREOF

(71) Applicant: SAMSUNG ELECTRONICS CO., LTD., Suwon-si (KR)

(72) Inventors: Byuk-sun Kim, Seoul (KR); Yong-deok Kim, Anyang-si (KR); Jong-bo Moon, Suwon-si (KR); Ho-june Yoo, Seoul (KR); Hye-jeong Lee, Seoul (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 656 days.

(21) Appl. No.: 13/674,464

(22) Filed: Nov. 12, 2012

(65) Prior Publication Data
US 2013/0132912 A1    May 23, 2013

(30) Foreign Application Priority Data

Nov. 17, 2011  (KR) .......................... 10-2011-0120004

(51) Int. Cl.
*G06F 3/0481* (2013.01)
*G06F 3/0487* (2013.01)

(52) U.S. Cl.
CPC .......... *G06F 3/0487* (2013.01); *G06F 3/04812* (2013.01)

(58) Field of Classification Search
None
See application file for complete search history.

(56) References Cited

U.S. PATENT DOCUMENTS

| | | | |
|---|---|---|---|
| 5,367,631 A | 11/1994 | Levy | |
| 5,703,620 A | 12/1997 | Keyson | |
| 6,392,675 B1 | 5/2002 | Becker et al. | |
| 8,462,112 B2 * | 6/2013 | Koski | 345/159 |
| 2002/0109678 A1 * | 8/2002 | Marmolin et al. | 345/180 |
| 2003/0007016 A1 * | 1/2003 | Laffey et al. | 345/861 |
| 2003/0038894 A1 | 2/2003 | Kim | |
| 2003/0210227 A1 * | 11/2003 | Smith | G06F 3/012 345/157 |
| 2004/0012562 A1 * | 1/2004 | Aymeric | G06F 3/04842 345/157 |

(Continued)

FOREIGN PATENT DOCUMENTS

| | | |
|---|---|---|
| EP | 1361504 A2 | 11/2003 |
| EP | 1589410 A2 | 10/2005 |

(Continued)

OTHER PUBLICATIONS

Communication issued Jan. 4, 2016 by the European Patent Office in counterpart European Application No. 12190606.9.

*Primary Examiner* — Matt Kim
*Assistant Examiner* — Daniel Samwel
(74) *Attorney, Agent, or Firm* — Sughrue Mion, PLLC (57) ABSTRACT

A graphical user interface, a display apparatus and a control method thereof are provided. The display apparatus includes: a display unit which displays thereon an image comprising a plurality of user interface (UI) objects and a pointer; a pointer adjuster which generates the pointer and moves the pointer based on a user command for moving the pointer received from an input device; and a controller which controls the pointer adjuster to adjust a moving speed of the pointer according to a density of the UI objects displayed on the display unit.

21 Claims, 7 Drawing Sheets

(56) References Cited

U.S. PATENT DOCUMENTS

| | | | |
|---|---|---|---|
| 2004/0189714 A1* | 9/2004 | Fox | G06F 3/04812 715/810 |
| 2005/0237300 A1* | 10/2005 | Baudisch et al. | 345/162 |
| 2007/0176900 A1* | 8/2007 | Nagar | 345/159 |
| 2007/0247435 A1 | 10/2007 | Benko et al. | |
| 2008/0244462 A1 | 10/2008 | Kim et al. | |
| 2009/0128483 A1 | 5/2009 | Robbins et al. | |
| 2009/0249257 A1 | 10/2009 | Bove et al. | |
| 2010/0138738 A1* | 6/2010 | Hattori | G06F 17/30905 715/246 |
| 2012/0146900 A1* | 6/2012 | Ishimoto et al. | 345/157 |
| 2013/0125066 A1* | 5/2013 | Klein et al. | 715/862 |

FOREIGN PATENT DOCUMENTS

| | | |
|---|---|---|
| JP | 612185 A | 1/1994 |
| JP | 1083254 A | 3/1998 |
| JP | 2006113831 A | 4/2006 |
| KR | 100301016 B1 | 9/2001 |
| KR | 1020050005072 A | 1/2005 |
| KR | 1020050115877 A | 12/2005 |
| KR | 1020070029405 A | 3/2007 |
| KR | 1020080088802 A | 10/2008 |
| KR | 1020080094297 A | 10/2008 |
| KR | 1020100050831 A | 5/2010 |
| KR | 1020100085957 A | 7/2010 |
| WO | 2009044432 A1 | 4/2009 |

* cited by examiner

GRAPHICAL USER INTERFACE, DISPLAY APPARATUS AND CONTROL METHOD THEREOF

CROSS-REFERENCE TO RELATED APPLICATION

This application claims priority from Korean Patent Application No. 10-2011-0120004, filed on Nov. 17, 2011 in the Korean Intellectual Property Office, the disclosure of which is incorporated herein by reference.

BACKGROUND

1. Field

Apparatuses and methods consistent with exemplary embodiments relate to a display apparatus and a control method thereof, and more particularly, to a display apparatus and a control method thereof which enables a user to move a pointer and to select a user interface (UI) object displayed on a screen, by manipulating an input device.

2. Description of the Related Art

A display apparatus processes an image signal or image data, which is input from the outside or stored therein, through various processing operations and displays an image. The display apparatus may be a television (TV), a monitor, a portable terminal by a display method.

To meet user demand for enjoying various contents through the display apparatus, the display apparatus has evolved from simply providing information as an image provider to performing various operations including providing applications, such as games and a browser to access to the Internet. To that end, a user interface (UI) and a pointer which is used for a user to select a UI object displayed as an icon or text are displayed on a screen. Then, a user may manipulate an input device such as a mouse or a touch pad to move the pointer and select a UI object.

In a display apparatus and a method for moving the pointer in the related art, a speed of moving the pointer by the manipulation of the input device may be manipulated by a user's setting. However, a user may desire to move the pointer faster in a particular area of a screen or move it slower in another area by same movements of the input device. For example, if the pointer is moved at a fixed speed, a user may overlook a UI object which he/she desires to select, in an area where UI objects are crowded, and if the pointer is set to move slower, a user may find it difficult to move the pointer to a long distance even in an area where UI objects are not crowded.

SUMMARY

Accordingly, one or more exemplary embodiments provide a graphical user interface, a display apparatus and a control method thereof which automatically changes a moving speed of a pointer according to particular criteria and ensures user's convenience and accurate movement of a pointer when a user moves the pointer with an input device.

According to an aspect of an exemplary embodiment, there is provided a display apparatus including: a display unit which displays thereon an image comprising a plurality of user interface (UI) objects; a pointer adjuster which generates the pointer and moves the pointer based on a user command for moving the pointer received from an input device; and a controller which controls the pointer adjuster to adjust a moving speed of the pointer according to a density of the UI objects displayed on the display unit.

The controller may divide the image into a first area where the density of the UI objects is greater than or equal to a predetermined level and a second area where the density of the UI objects is less than the predetermined level.

The moving speed of the pointer may be adjusted when the pointer is located in the first area to be slower than the moving speed of the pointer when the pointer is in the second area.

The controller may control the pointer adjuster to adjust the moving speed of the pointer according to the density of the UI objects if the user command for moving the pointer is slower than a predetermined speed.

The controller may control the pointer adjuster to adjust the moving speed of the pointer if the pointer moves in a predetermined direction.

The controller may control the pointer adjuster to adjust the moving speed of the pointer if the density of the UI objects arranged in a direction parallel to the moving direction of the pointer is greater than or equal to a predetermined level.

The controller may control the pointer adjuster to intermittently move the pointer between the UI objects in response to the user command for moving the pointer.

The controller may control the display unit to display a notification of the adjustment of the moving speed of the pointer.

The image may include web page, and the UI objects may include a link.

The input device may include at least one of a mouse, a touch pad and a joy stick.

The pointer may include a circular area pointer including a predetermined area.

According to an aspect of another exemplary embodiment, there is provided a control method of a display apparatus, the control method including: displaying an image comprising a plurality of user interface (UI) objects, and a pointer; receiving a user command for moving the pointer from an input device; moving the pointer based on the user command for moving the pointer; and adjusting a moving speed of the pointer according to a density of the UI objects displayed in the image.

The method may further include dividing the image into a first area where the density of the UI objects is greater than or equal to a predetermined level and a second area where the density of the UI objects is less than the predetermined level.

The moving speed of the pointer may be reduced when the pointer is located in the first area relative to the speed of the pointer when it is in the second area.

The method may further include reducing the speed of the pointer according to the density of the UI objects when the user command for moving the pointer is slower than a predetermined speed.

The method may further include reducing the speed of the pointer according to the density of the UI objects when the pointer moves in a predetermined direction.

The adjusting the moving speed may include adjusting a moving speed of the pointer if the density or number of the UI objects arranged in a direction parallel to the moving direction of the pointer is at a predetermined level or predetermined number or more.

The moving the pointer may include intermittently moving the pointer between the UI in response to the user command for moving the pointer.

The method may further include displaying a notification of the adjustment of the moving speed of the pointer.

The image may include a web page, and the UI objects may include a link.

The input device may include at least one of a mouse, a touch pad and a joy stick.

The pointer may include a circular area pointer comprising a predetermined area.

According to an aspect of another exemplary embodiment, there is provided a graphical user interface for a computing device including a receiver which receives a user command from an input device and a display unit. The graphical user interface may include a plurality of user interface (UI) objects, a pointer which moves in response to input received by the receiver, and adjusting a moving speed of the pointer according to a density of the UI objects displayed on the display unit The graphical user interface may be divided into a first area where the density of the UI objects is greater than or equal to a predetermined level and a second area where the density of the UI objects is less than the predetermined level, and the adjusting the moving speed of the pointer may include adjusting the moving speed of the pointer when the pointer is located in the first area to be slower than to the moving speed of the pointer when the pointer is located in the second area.

The moving speed of the pointer may be adjusted according to the density of the UI objects if the user's command for moving the pointer is equal to or slower than a predetermined speed.

The moving speed of the pointer may be reduced if the density of the UI objects arranged in a direction parallel to the moving direction of the pointer is greater than or equal to a predetermined level.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
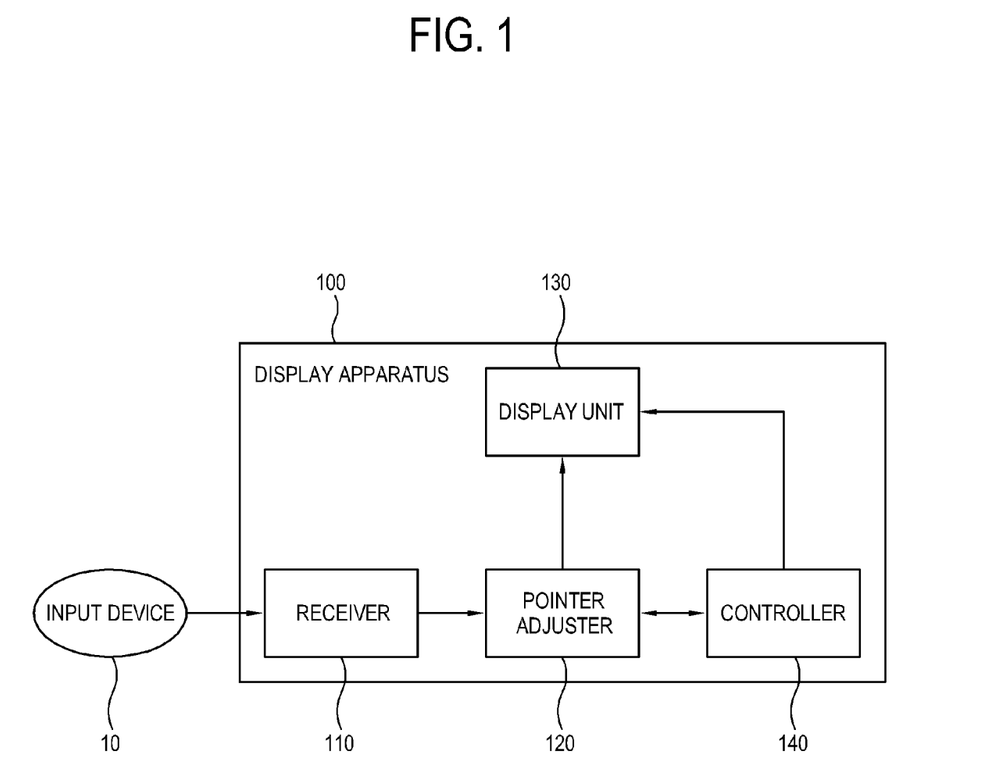
FIG. 1 is a control block diagram of a display apparatus according to an exemplary embodiment.

FIG. 1 is a control block diagram of a display apparatus 100 according to an exemplary embodiment.

As shown therein, the display apparatus 100 according to an exemplary embodiment includes a receiver 110, a pointer adjuster 120, a display unit 130, and a controller 140. The display apparatus 100 may be connected to an external input device in wired/wireless manner, may receive a user's command for moving a pointer, and may move the pointer within a displayed screen according to the command. A user may move and locate the pointer in an area of a particular user interface (UI) object to select a UI object. The display apparatus 100 may perform an operation according to the selected UI object. The display apparatus 100 may include, but not limited to, a television (TV), a monitor, a portable terminal, etc.

The pointer which is used in the display apparatus 100 may include a circular area pointer including a predetermined area of a screen. The area pointer may be generated as a circle which centers on a particular coordinate of the pointer and has a radius ranging from the particular coordinate to the closest UI object, according to a known area pointing algorithm. The area pointer may be changed in size according to movement of the pointer. The area pointer may be provided to select a UI object if a particular area of the area pointer overlaps a particular area of the UI object. Otherwise, other known pointers may be used to embody the display apparatus 100 according to an exemplary embodiment.

The input device 10 which transmits a command to the display apparatus 100 may include, for example, a mouse, a touch pad, a joy stick, and/or a remote control, but is not limited thereto. A user may not only operate the display apparatus 100 with a single input device 10, but also connect a plurality of input devices 10 in a wired/wireless manner to the display apparatus 100 and operate the display apparatus 100.

The receiver 110 receives a user's command from the input device 10. If the input device 10 is connected in a wired manner, the receiver 110 may include a personal system/2 (PS/2) port or a universal serial bus (USB) port to be connected to the input device 10. If the input device 10 is connected to the display apparatus 100 by wireless communication such as infrared (IR) or Bluetooth, the receiver 110 may include a wireless communication module to receive data from the input device 10. A user's command may include a command for moving the pointer to select a UI object, or other various commands to control display statuses.

The pointer adjuster 120 generates a pointer, and moves the pointer based on a user's command for moving the pointer which is received by the receiver 110. The user's command for moving the pointer includes commands for moving direction and moving speed of the pointer. The pointer adjuster 120 moves the pointer from a current location upon receiving the command for moving the pointer. The pointer moving speed may be set as a default or set by a user and may be adjusted by a control of the controller 140 (to be described later).

The display unit 130 displays thereon an image including a plurality of UI objects. The display apparatus 100 receives an image signal from an external image supply source through an image receiver (not shown), processes the received image signal including decoding, deinterlacing and scaling operations corresponding to various image formats, and displays the processed image on the display unit 130. The display unit 130 may include a display panel (not shown) to display an image thereon, and a panel driver (not shown) to drive the display panel and display an image thereon, but not limited thereto.

The display unit 130 may display thereon a pointer generated by the pointer adjuster 120 and included in the image. The pointer may move within an image and overlap a UI object. The image displayed on the display unit 130 may include a webpage, and the UI object may include a link included in the web page.

The controller 140 performs overall control operations for the display apparatus 100 according to the present disclosure. The controller 140 may include a control program stored in whole or in part on a storage device or storage devices such as a non-volatile memory, a read only memory (ROM), a flash memory, a volatile memory such as a random access memory (RAM), etc. The controller 140 may include a hardware processor such as a central processing unit (CPU) or a graphics processing unit (GPU) executing the loaded control program, a micro control unit (MCU), etc.

The controller 140 controls the pointer adjuster 120 to move the pointer from a current location according to a command for moving the pointer received through the receiver 110. The controller 140 may monitor in real-time a current location coordinate of the pointer and a density of UI objects included in an image. Upon satisfaction of predetermined conditions, the controller 140 may control the pointer adjuster 120 to adjust a moving speed of the pointer corresponding to a user's command for moving the pointer. For example, if a user moves a mouse as the input device 10 to the left at a consistent speed, the coordinate of the pointer displayed in the image may move faster or slower than the original speed.

Figure 2:
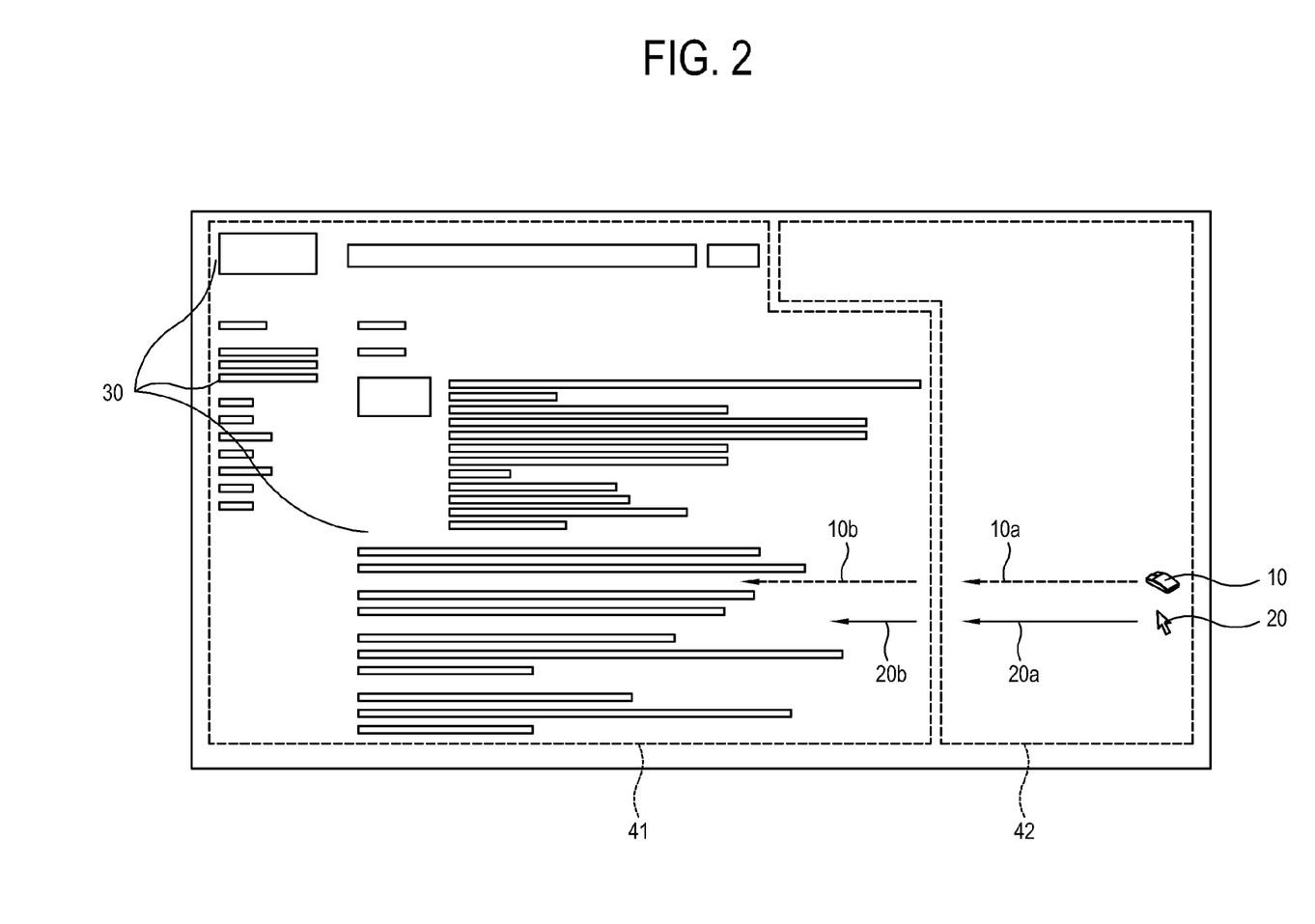
FIG. 2 illustrates a moving speed of a point depending on a density of user interface (UI) objects according to an exemplary embodiment.
Figure 3:
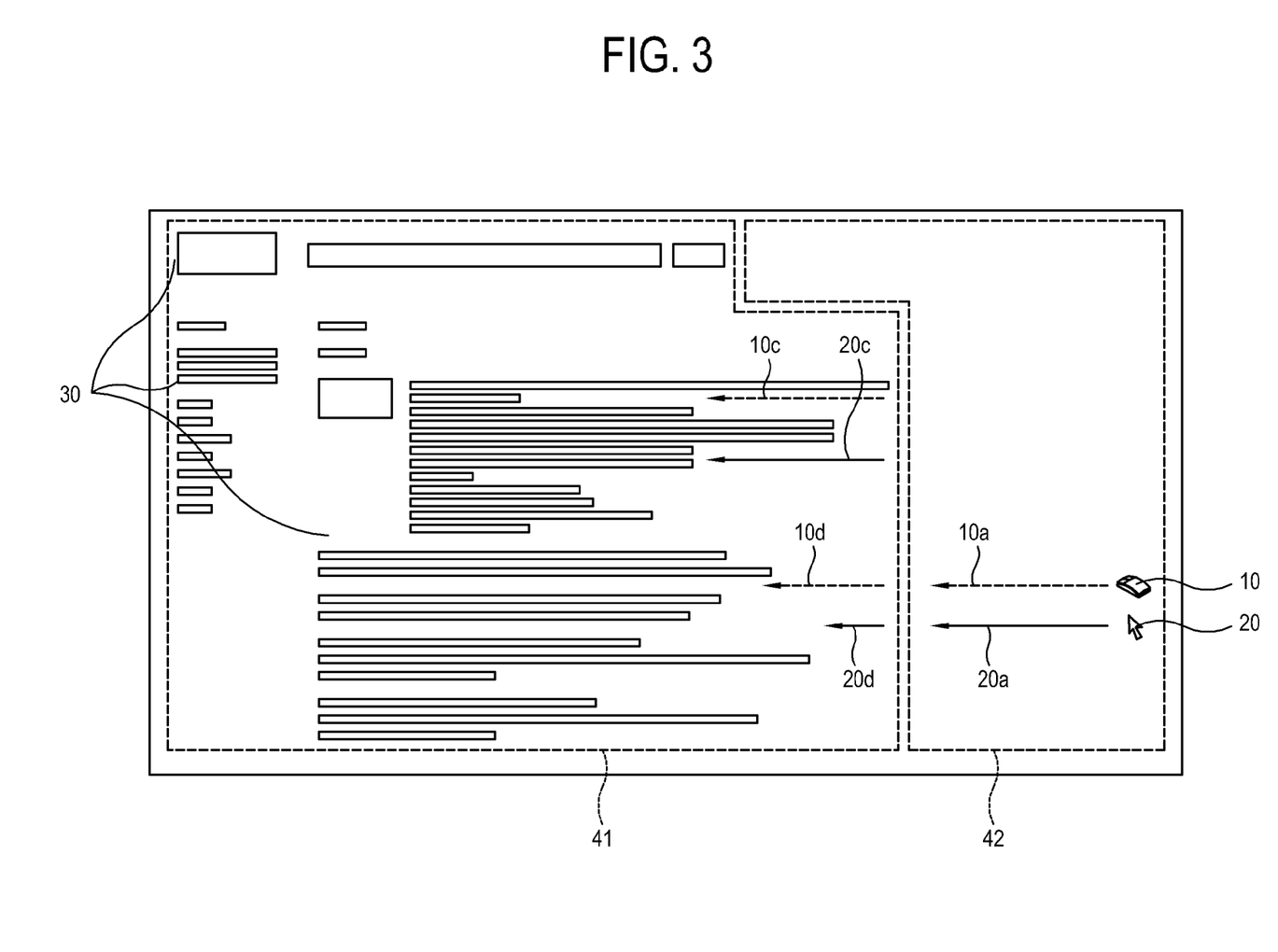
FIG. 3 illustrates a moving speed of a pointer depending on a speed of a user's moving command according to an exemplary embodiment.
Figure 4:
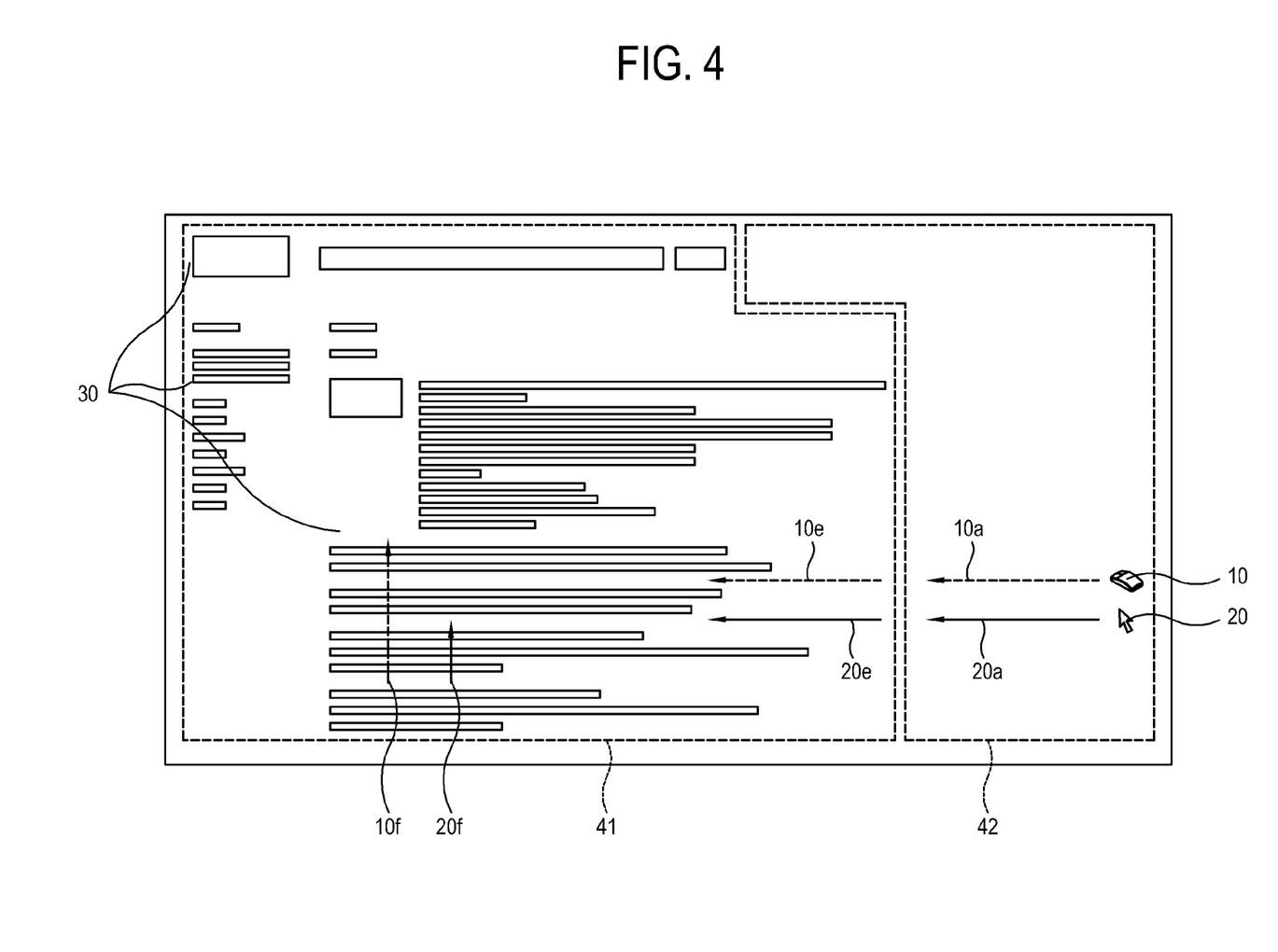
FIG. 4 illustrates a moving speed of the pointer depending on a moving direction of the pointer according to an exemplary embodiment.

A representative example of adjusting the moving speed of the pointer by the controller 140 according to an exemplary embodiment according to predetermined conditions will be described with reference to FIGS. 2 to 4. In FIGS. 2 to 4, a user's command for moving the pointer and the size of the moving distance of the pointer according to the command are expressed as lines, and the length of the lines indicated in FIGS. 2 to 4 are for comparison of size with other values and do not mean any particular distance or speed. In FIGS. 2 to 4, the input device 10 includes a mouse as an example.

While the exemplary embodiment is described with reference to a display apparatus 100 which includes a display unit 130, the inventive concept may be embodied in a computing apparatus which includes the receiver 110, the pointer adjuster 120, the controller 140, and an image processor which outputs an image signal to an external display. Similarly, the inventive concept may be embodied in a graphical user interface for such a computing device.

FIG. 2 illustrates a moving speed of the pointer 20 depending on the density of a UI object 30 according to an exemplary embodiment.

As shown therein, a displayed image may include a plurality of UI objects 30 displayed therein. The UI object 30 may be crowded and located in a particular area of the image. The controller 140 may control the pointer adjuster 120 to adjust the moving speed of the pointer 20 according to the density of the UI object 30. The density of the UI object 30 may be determined at the ratio of the width of a part of the image and the width of the area where the UI object 30 included in the image is displayed. The pointer 20 may move faster if the UI object 30 is less dense, and move slower if the UI object 30 is denser.

The controller 140 may sub-divide an image by distinguishing between a first area 41 where the density of the UI object 30 is at a predetermined level or more, and a second area 42 where the density thereof is below the predetermined level. As shown in FIG. 2, if the UI object 30 is densely distributed in a particular area of the image, the concerned area may be classified as a first area 41. The controller 140 may determine the particular density, a reference for classifying the first area 41 and the second area 42, based on a number of the UI object 30 included in the image.

The moving speed of the pointer 20 may be slower when the pointer 20 is located in the first area 41 than in the second area 42. In FIG. 2, if the size of the user's command for moving the pointer 20 (moving speed of the mouse) is 10*a* and the size of the moving speed of the pointer 20 is set at 20*a* as default, the pointer 20 moves as much as 20*b* which is smaller than 20*a* even if a user moves the input device 10 as much as 10*b* which is equal to 10*a*, when the pointer 20 moves and is located in the first area 41.

As described with reference to FIG. 2, in the area where the UI object 20 is denser, the moving speed of the pointer 20 is automatically reduced to enable finer adjustment. Thus, if a user desires to select a particular UI object 30, overlooking a desired UI object 30 may be prevented. In the area where the UI object is less dense, the moving speed of the pointer 20 is raised to enable a user to more easily move the pointer 20 since there is a lower possibility that a user desires to move the pointer 20 to a particular location.

FIG. 3 illustrates an exemplary embodiment of a moving speed of the pointer 20 depending on a speed of a user's command for moving the pointer 20.

According to an exemplary embodiment, the controller 140 may monitor a user's command for movement—for example, a motion of a mouse—and control the pointer adjuster 120 to adjust the moving speed of the pointer 20 if the speed is lower than a predetermined speed. The controller 140 may monitor in real-time a location coordinate of the pointer 20 depending on a resolution, and calculate the moving speed of the pointer 20 by measuring variation of the location coordinate of the pointer 20 over time. The predetermined speed may be set as a default initially or subject to change depending on a user's setting and the density of the UI object 30 included in an image.

As shown in FIG. 3, if the moving speed of the mouse in the first area 41 is 10*c* of a predetermined speed or higher, the pointer 20 moves at the speed of 20*c* same as 20*a* in the second area 42. If the moving speed of the mouse in the first area 41 is 10*d* lower than the predetermined speed, the pointer 20 moves at the speed of 20*d* slower than 20*a* and 20*c*.

As described with reference to FIG. 3, even if the pointer 20 is located in the area where the UI object 30 is denser, the pointer 20 is not adjusted in speed upon a user's command that is predetermined speed or higher since a user does not intend to select a particular UI object 30. Only upon a user's command that is lower than the predetermined speed, the pointer 20 is adjusted in speed to thereby enhance user's convenience in using the pointer 20.

FIG. 4 illustrates an exemplary embodiment of a moving speed of the pointer 20 depending on a moving direction of the pointer 20.

According to an exemplary embodiment, if a pointer 20 has a predetermined moving direction, the controller 140 may control the pointer adjuster 120 to adjust the moving speed of the pointer 20. More specifically, depending on the number or density of the UI objects 30 arranged in a direction parallel to the moving direction of the pointer 20, the controller 140 may control the pointer adjuster 120 to adjust the moving speed of the pointer 20. In this case, if the pointer 20 moves in a direction where the number of UI objects 30 is a predetermined number or more, the pointer 20 may be adjusted to move at a lower speed.

As shown in FIG. 4, if the moving direction of the mouse in the first area 41 is to the left (for example, the direction shown by 10*e*), the number of the UI objects 30 located in the moving direction is small and the pointer 20 is not adjusted in speed and moves at the speed 20*a*. If the moving direction of the mouse is up (for example, the direction shown by 10*f*) and the pointer moves in a parallel direction, the pointer speed is adjusted to 20f, which is smaller than 20a and 20e, since there are a large number of UI objects 30 in the moving direction.

As described with reference to FIG. 4, if the pointer 20 moves in the direction where there are a number of UI objects 30, a user is more likely to select a particular UI object 30 and the pointer 20 may be reduced in speed only in that case to thereby enhance user's convenience in using the pointer 20.

FIGS. 2 to 4 illustrate the pointer 20 which continues to move, but a user may intend to move the pointer 20 to locate it only in the area of the plurality of UI objects 30 in an image. Therefore, the controller 140 may control the pointer adjuster 120 to intermittently move the pointer 20.

Figure 5:
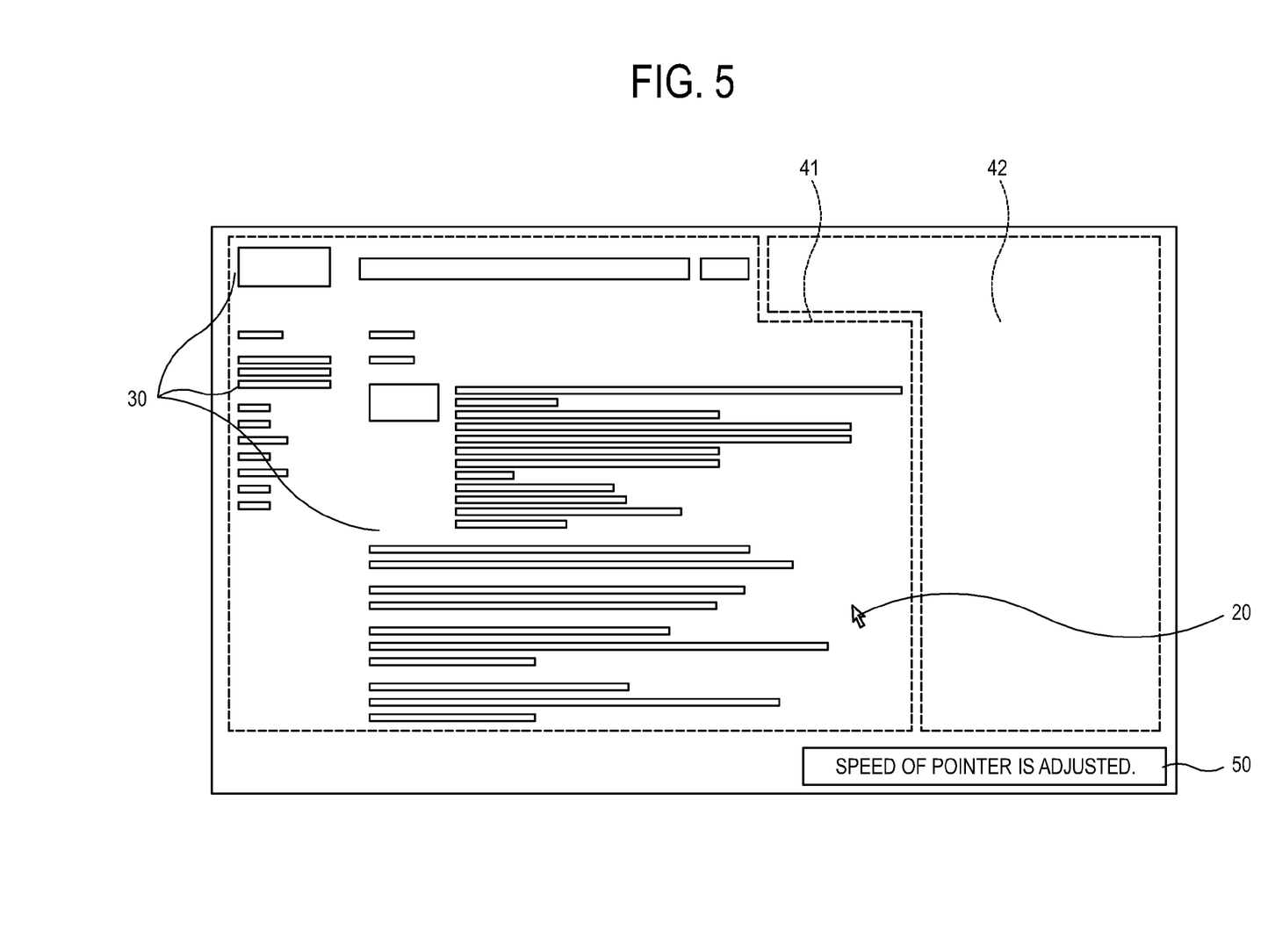
FIG. 5 illustrates a screen which displays a notice that is given when the moving speed of the pointer is adjusted according to an exemplary embodiment.

FIG. 5 illustrates an exemplary embodiment of a screen which displays a notice that is given when the moving speed of the pointer is adjusted;

The adjustment of the speed of the pointer 20 as described above is automatically performed according to the location of the pointer 20, the speed of the user's command for moving the pointer 20, and moving direction of the pointer 20. Upon the adjustment of the speed, a notice thereof may be given to a user.

As shown in FIG. 5, if the pointer 20 is located in the first area 41 and the controller 140 controls the pointer adjuster 120 to reduce the speed of the pointer 20, the controller 140 may display on the display unit 130 a predetermined icon or text 50 to notify the adjustment of the speed of the pointer 20.

Figure 6:
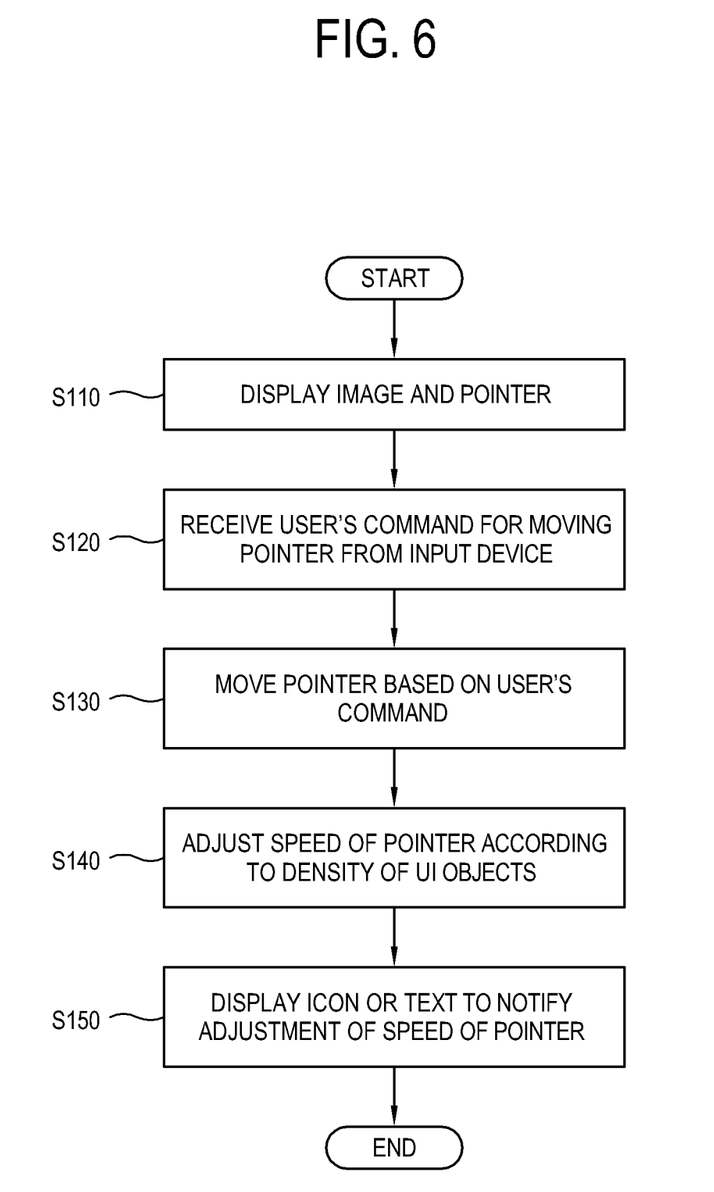
FIG. 6 is a first control flowchart of the display apparatus according to an exemplary embodiment.

FIG. 6 is a first control flowchart of the display apparatus 100 according to an exemplary embodiment.

The display apparatus 100 according to an exemplary embodiment may be connected to an external input device 10 in a wired/wireless manner and receive a user's command for moving the pointer 20 and may move the pointer 20 on the displayed screen according to the command. A user may manipulate the input device to move the pointer 20 to a particular UI object 30 and perform an operation according to such manipulation.

The display apparatus 100 may include a television (TV), a monitor, a portable terminal, etc. The input device 10 which is connected to the display apparatus 100 may be a mouse, a touch pad, a joy stick, a remote control, etc.

As shown therein, the display apparatus 100 displays an image including a plurality of UI objects, and the pointer (S110). The display apparatus 100 receives an image signal, processes the image signal corresponding to various image formats, and displays the processed image. The displayed image may include a web page, and the UI objects may include a link of the web page. The pointer which is used in the display apparatus 100 may include a circular area pointer including a predetermined area of a screen.

The display apparatus 100 receives a user's command for moving the pointer from the input device 10 (S120), and moves the pointer based on the user's command (S130). The moving speed of the pointer may be set as a default or may be set by a user's setting.

The display apparatus 100 adjusts the moving speed of the pointer depending on the density of the UI objects moved by the pointer (S140). The density of the UI objects may be determined at the ratio of the width of a certain area of the image and the number and size of UI objects within the certain area. The pointer may move faster where the UI objects are less dense and move slower where the UI objects are denser.

As the adjustment of the speed of the pointer is automatically performed according to the location of the pointer, speed of the user's command for moving the pointer, and the moving direction of the pointer, and upon adjustment of the pointer, a notice thereof may be given to a user. Thus, the display apparatus 100 may display a predetermined icon or text which notifies such adjustment if the pointer is located in the first area (S150).

The pointer continuously moves in the foregoing exemplary embodiment, but a user may intend to move the pointer to locate it only in the area of the plurality of UI objects in an image. Therefore, the display apparatus 100 may move the pointer intermittently between the UI objects.

By the foregoing method, in the area where the UI object 20 is more sense, the moving speed of the pointer 20 is automatically reduced to enable a finer adjustment. Therefore, if a user desires to select a particular UI object 30, overlooking a desired UI object 30 may be prevented. In the area where the UI object is less dense, the moving speed of the pointer 20 is raised to enable a user to more easily move the pointer 20 since there is a lower probability that a user desires to move the pointer 20 to a particular location.

Figure 7:
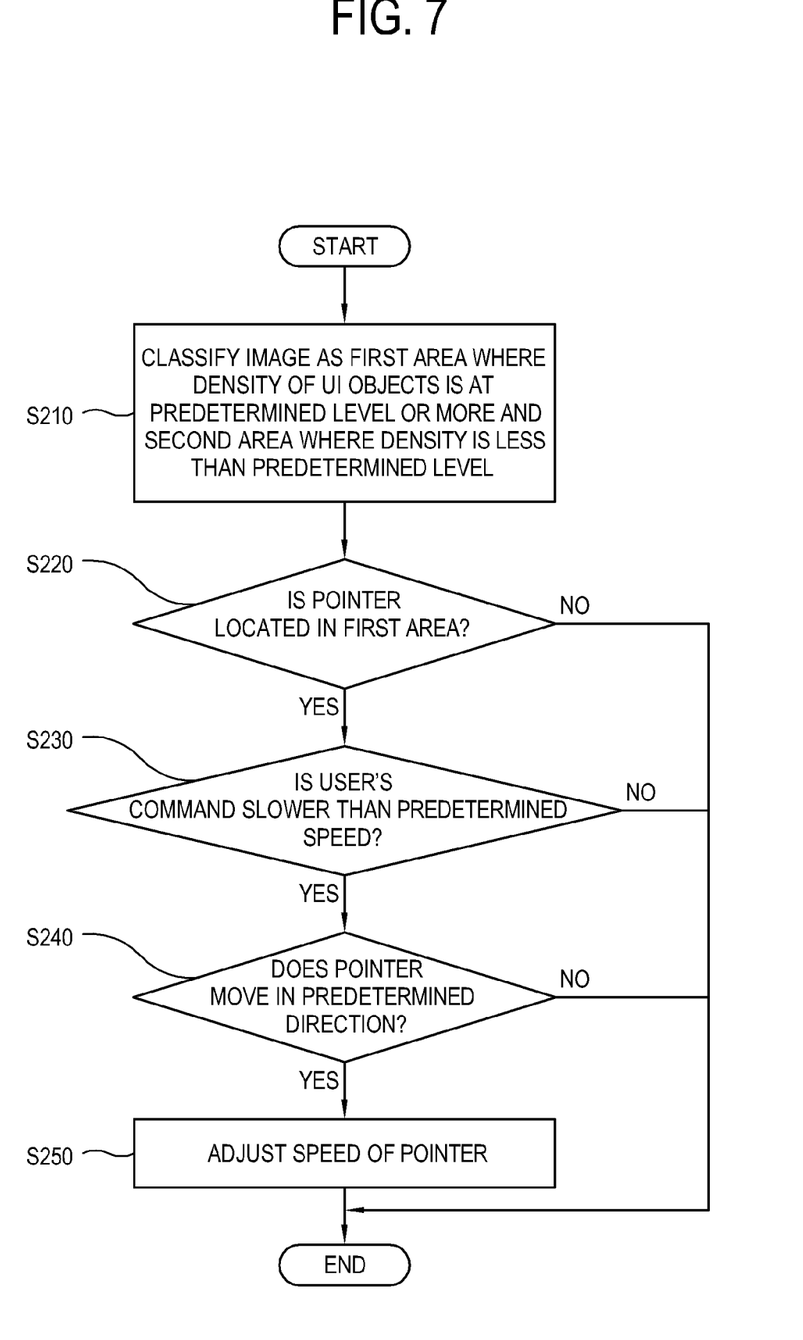
FIG. 7 is a second control flowchart of the display apparatus according to an exemplary embodiment.

FIG. 7 is a second control flowchart of the display apparatus 100 according to an exemplary embodiment.

The display apparatus 100 classifies the displayed image as the first area where the density of the UI objects is at a predetermined level or more, and the second area where the density thereof is lower than the predetermined level (S210). The controller determines whether the pointer is located in the first area (S220), and adjusts the moving speed of the pointer if the pointer is located in the first area. The moving speed of the pointer may be slower in the first area than in the second area. Details are the same as those described with reference to FIG. 2 as above.

The display apparatus 100 may further include an operation of determining whether the user's command for moving the pointer is slower than the predetermined speed (S230), and may adjust the moving speed of the pointer if the command is slower than the predetermined speed. Details are the same as those described with reference to FIG. 3.

The display apparatus 100 may further include an operation of determining whether the pointer moves in the predetermined direction (S240), and may adjust the moving speed of the pointer if the pointer moves in the predetermined direction. The predetermined direction may include a direction whether a lot of UI objects are located in an image. Details are the same as those described with reference to FIG. 4.

The operations S220, 230 and 240 in FIG. 7 may change in sequence, and only a part of operations may embody the present disclosure.

As described above, a graphical user interface, a display apparatus and a control method according to exemplary embodiments automatically adjust a moving speed of a pointer according to a density of UI objects to thereby enhance user's convenience and improve accuracy of pointing.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
   a display unit which displays thereon an image comprising a plurality of user interface (UI) objects and a pointer;
   a pointer adjuster which generates the pointer and moves the pointer based on a user command for moving the pointer received from an input device; and
   a controller which determines a first density based on a number of the plurality of UI objects in the image, subdivides the image, based on the first density, into a first area of the image having a first UI density greater than the first density and a second area of the image having a second UI density less than the first density, and controls the pointer adjuster to adjust a moving speed of the pointer according to a density of the UI objects displayed on the display unit.

2. The display apparatus according to claim 1, wherein the controller controls the pointer adjuster to adjust the moving speed of the pointer when the pointer is located in the first area to be slower than the moving speed of the pointer when the pointer is located in the second area.

3. The display apparatus according to claim 2, wherein the controller controls the pointer adjuster to adjust the moving speed of the pointer according to the density of the UI objects when the user command for moving the pointer is slower than a predetermined speed.

4. The display apparatus according to claim 1, wherein the controller controls the pointer adjuster to adjust the moving speed of the pointer when the pointer moves in a predetermined direction.

5. The display apparatus according to claim 1, wherein the controller determines a second density based on a corresponding number of the plurality of UI objects along a moving direction of the pointer, determines a corresponding location of the pointer among the first area and the second area, and controls the pointer adjuster to adjust the moving speed of the pointer according to the corresponding location and the second density.

6. The display apparatus according to claim 2, wherein the controller controls the pointer adjuster to intermittently move the pointer between the UI objects in response to the user command for moving the pointer.

7. The display apparatus according to claim 2, wherein the controller controls the display unit to display a notification of the adjustment of the moving speed of the pointer.

8. The display apparatus according to claim 1, wherein the image comprises a web page, and the UI objects comprise links.

9. The display apparatus according to claim 1, wherein the input device comprises at least one of a mouse, a touch pad and a joy stick.

10. The display apparatus according to claim 1, wherein the pointer comprises a circular area pointer comprising a predetermined area.

11. The display apparatus according to claim 1, wherein the first area is an irregular polygon.

12. A control method of a display apparatus, the control method comprising:
  displaying an image comprising a plurality of user interface (UI) objects, and a pointer;
  determining a first density based on a number of the plurality of UI objects in the image;
  sub-dividing the image, based on the first density, into a first area of the image having a first UI density greater than the first density and a second area of the image having a second UI density less than the first density and;
  receiving a user command for moving the pointer from an input device;
  moving the pointer based on the user command for moving the pointer; and
  adjusting a moving speed of the pointer according to a density of the UI objects displayed in the image.

13. The control method according to claim 12, wherein the adjusting the moving speed of the pointer comprises adjusting the moving speed of the pointer when the pointer is located in the first area to be slower than the moving speed of the pointer when the pointer is located in the second area.

14. The control method according to claim 13, further comprising determining whether the user command for moving the pointer is slower than a predetermined speed,
  wherein the adjusting the moving speed of the pointer comprises reducing the moving speed of the pointer according to the density of the UI objects when the user command for moving the pointer is slower than the predetermined speed.

15. The control method according to claim 12, further comprising determining whether the pointer moves in a predetermined direction,
  wherein the adjusting the moving speed of the pointer comprises reducing the moving speed of the pointer according to the density of the UI objects when the pointer moves in the predetermined direction.

16. The control method according to claim 12, further comprising:
  determining a second density based on a corresponding number of the plurality of UI objects along a moving direction of the pointer;
  determining a corresponding location of the pointer among the first area and the second area,
  wherein the adjusting the moving speed of the pointer comprises adjusting the moving speed of the pointer according to the corresponding location and the second density.

17. The control method according to claim 13, wherein the moving the pointer comprises intermittently moving the pointer between UI objects in response to the user command for moving the pointer.

18. The control method according to claim 13, further comprising displaying a notification of the adjustment of the moving speed of the pointer.

19. The control method according to claim 12, wherein the image comprises a web page, and the UI objects comprise links.

20. The control method according to claim 12, wherein the input device comprises at least one of a mouse, a touch pad and a joy stick.

21. The control method according to claim 12, wherein the pointer comprises a circular area pointer comprising a predetermined area.

* * * * *